May 2, 1972  J. BOICHARD ET AL  3,660,481
PROCESS FOR THE PREPARATION OF CARBOXYLIC ACIDS
Filed Oct. 22, 1968
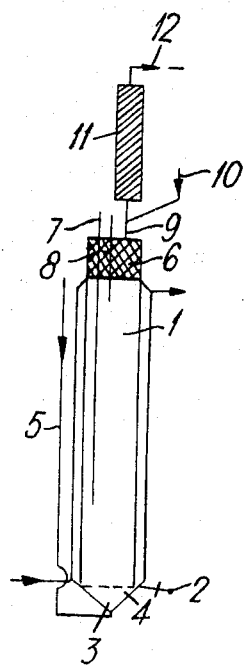
Inventors
Jacques Boichard
Bernard Brossard
Michel Gay &
Raymond Janin
By Cushman Darby & Cushman
Attorney

United States Patent Office 3,660,481
Patented May 2, 1972

3,660,481
PROCESS FOR THE PREPARATION OF
CARBOXYLIC ACIDS
Jacques Boichard, Irigny, Rhone, and Bernard Brossard, Michel Gay, and Raymond Janin, Lyon, Rhone, France, assignors to Rhone-Poulenc S.A., Paris, France
Filed Oct. 22, 1968, Ser. No. 769,664
Claims priority, application France, Oct. 25, 1967, 125,843
Int. Cl. C07c 53/08, 51/16
U.S. Cl. 260—533 R
3 Claims

ABSTRACT OF THE DISCLOSURE

Mixtures of aliphatic carboxylic acids consisting mainly of acetic and propionic acids, with some oxalic acid, are obtained by oxidising 1-butene, alone or with 2-butene, with nitric acid.

---

The present invention relates to the production of aliphatic carboxylic acids from 1-butene; alone or in admixture with 2-butene.

Linear butenes have been oxidised in the gas phase to carboxylic acids, more particularly acetic and propionic acid, with air at temperatures of 200° to 300° C., and at normal pressure or superatmospheric pressure up to 15 bars (see French patent specification No. 1,470,474). However, the oxidation of unsaturated hydrocarbons containing more than 2 carbon atoms in the liquid phase at high temperature yields mixtures of acids, glycols and their esters. These products tend to resinify and the yields of unsable products are low. Attempts to oxidise linear butenes directly to acetic acid, in the liquid phase, have moreover failed [see Brockhaus, Chemie Ing. Techn. 38 (10) 1039 (1966)].

It has now been found that mixtures of aliphatic carboxylic acids consisting mainly of acetic and propionic acids, with some oxalic acid, can be prepared, without resorting to the use of high temperatures, by contacting 1-butene, alone or in admixture with 2-butene, with nitric acid.

The reaction temperature may be 20° to 100° C. Though it is not necessary to work under pressure to obtain good yields of carboxylic acids, it is possible to work under pressure without going outside the scope of the invention.

The concentration of the nitric acid used may vary within wide limits. Concentrations of from 20 to 90% by weight are generally very suitable. During the reaction it is possible, depending on the acid concentration used, to allow the concentration of nitric acid in the medium to decline or to maintain it near its initial value by adding fresh nitric acid, and optionally nitric acid recovered in an external regeneration zone by oxidation of the nitrous vapours produced during the reaction. It is also possible to oxidise the latter in the reaction medium itself by passing a stream of oxygen, or of a gas containing oxygen, such as air, into the medium. In this case the nitric acid concentration is maintained by adding a sufficient amount of nitric acid to compensate for the disappearance of that which has been converted into irrecoverable nitrogen, such as $N_2$ or $N_2O$.

A vanadium-based catalyst can optionally be added to the oxidation medium. The vanadium derivative is, in this case, preferably a vanadium derivative which is at least partially soluble in nitric acid. The degree of oxidation of the vanadium ion is not critical. Suitable such derivatives include vanadium pentoxide ($V_2O_5$); vanadium salts, e.g. vanadium halides such as $VF_5$, vanadium oxyhalides such as $VOF_3$, $VOBr_3$ and $VOCl_3$, vanadium sulphate ($V_2O_5.2SO_3$), vanadium nitrate, vanadium phosphate, vanadyl sulphate ($VOSO_4$), vanadyl nitrate, vanadyl phosphate, and vanadium sulphates such as $VSO_4$ and $V_2(SO_4)_3$; and alkali metal and ammonium vanadates e.g. orthovanadates [$Na_3VO_4$, $K_3VO_4$, $(NH_4)_3VO_4$], metavanadates [$LiVO_3$, $NaVO_3$, $NH_4VO_3$], hexavanadates [$Na_2O.3V_2O_5.3H_2O$], and hypovanadates $$(Na_2V_4O_9.4H_2O, K_2V_4O_9)$$

The amount of vanadium present in the oxidation medium may vary within wide limits. Though it is possible, for example, to use vanadium concentrations of 10% by weight, it is not necessary to exceed a concentration of 5% by weight. Even very low concentrations of vanadium, e.g. 0.001% by weight, have an appreciable effect.

The new process may be applied to the oxidation of 1-butene by itself, and to the oxidation of mixtures of 1-butene with 2-butene such as those obtained from petroleum distillation cuts. The 2-butene content may vary within wide limits.

The yields of the various acids formed vary according to the reaction conditions such as temperature, nitric acid concentration, presence or absence of catalyst and composition of the butene mixture. The reaction can be oriented towards the preferential formation of a particular carboxylic acid by suitably choosing the working conditions, which can be found by simple experiment.

The new process may be operated continuously. Generally, the only precautions which have to be taken are the usual precautions inherent in the handling of mixtures of organic compounds and nitric acid.

The following examples illustrate the invention.

EXAMPLE 1

The apparatus used, which is shown diagrammatically in the accompanying drawing, consists of the following elements: a cylindrical glass reactor 1 of 500 mm. height, 43 mm. diameter and 700 cm.³ useful volume, equipped with a double jacket and an outlet tap 2 at the bottom; a conical chamber 3 joined to the lower part of the reactor 1 and closed off at the level at which it joins the latter, by a No. 3 sintered glass plate 4 (pores of average diameter between 15 and 40μ); a tube 5 for introducing 1-butene and optionally another gas, which starts at the top of the conical chamber 3 and can be connected to a source of butene or other gas; a reactor head consisting of a ground stopper 6 fitted with a sleeve 7 for a platinum thermometer probe, a tube 8 for admitting oxygen, and a tube 9 connected first to a capillary tube 10 intended for the continuous admission of nitric acid into the reactor and secondly to a coil condenser 11 fed with a stream of ethylene glycol/water (50/50) at −5° C. and intended to condense part of the nitrous vapours coming from the reactor 1. A stream of water at 45–50° C. circulates in the double jacket of the reactor 1 so as to keep the reaction mixture at the desired temperature. The issuing gases are led, by means of the tube 12, to a device not shown in the drawing which comprises a column for counter-current washing with water, a 110-volume hydrogen peroxide absorber to absorb the remainder of the nitrous vapours, and a gas chromatography analysis apparatus which allows any unconverted butene present, as well as other gases coming from the reaction, to be determined.

Before starting the process, a slight pressure of nitrogen is established under the sintered glass plate 4 to avoid any liquid entering into the chamber 3, and 283 g. of a solution, obtained from 0.141 g. of sodium metavanadate, 332.8 g. of 93.5% strength nitric acid, and 95 g. of water, are then introduced. This solution provides initial concentrations of 72.7% by weight of nitric acid and 0.0138% by weight of vanadium metal.

The introduction of the nitrogen via tube 5 is then replaced by the introduction of 1-butene at a constant rate of 2.25 litres/hour (the volume being expressed under standard pressure and temperature conditions). Oxygen is simultaneously introduced by the tube 8 at a constant rate of about 5.5 litres/hour. The temperature of the reaction medium is kept at 50° C. 93.5% strength nitric acid is added by means of a pump through the capillary tube 10 in order partially to compensate for the reduction of the nitric acid concentration in the reaction medium. The stream of 1-butene is maintained for 5 hours during which time 96 g. of 93.5% strength nitric acid are added.

28.1 g. of 1-butene, i.e. 0.501 mol, are passed in total. At no time is the presence of 1-butene in the issuing gases observed. A slight pressure of nitrogen is again established under the sintered glass plate 4, and the reaction mixture is then kept at 50° C. for 2 hours 30 minutes, the nitrous vapours being reoxidised and partly carried to the recovery device by means of a stream of oxygen at 5.5 litres/hour introduced through the tube 8.

After cooling to 18° C., the reaction mixture, which weighs 333 g. and in which the nitric acid concentration is 58%, is withdrawn. A first aliquot part of this mixture is subjected to steam stripping; it is found (by determination with mercuric chloride) that no formic acid is present in the aqueous distillate containing the strippable organic acids. Analysis by vapour phase chromatography of the aqueous distillate shows that the latter contains a mixture of propionic acid and acetic acid in the molar ratio of 4.6/1. Potentiometric determination of the aqueous distillate shows a molar yield of monocarboxylic organic acidity of 97.2% based on the 1-butene converted, corresponding to the formation of 0.4 mol of propionic acid and 0.087 mol of acetic acid.

In a second aliquot part of the reaction mixture, 0.014 mol of oxalic acid are detected by manganimetric determination after precipitation of the oxalic acid as its calcium salt.

The molar yields (number of mols produced per 100 mols of 1-butene employed) of the reaction with respect to the various products formed are given in the table below. The carbon balance is the percentage of the carbon in the 1-butene used to form each of the reaction products.

| Products | Quantity in mols | Carbon balance, percent | Molar yield per mol of 1-butene converted, percent |
|---|---|---|---|
| Oxalic acid | 0.014 | 1.4 | 2.8 |
| Propionic acid | 0.4 | 60 | 80 |
| Acetic acid | 0.087 | 8.6 | 17.4 |
| Formic acid | 0 | 0 | 0 |
| CO | 0.06 | 1.5 | 12 |
| $CO_2$ | 0.531 | 26.6 | 106 |

EXAMPLE 2

The procedure of Example 1 is followed but using 300 g. of 73% by weight nitric acid containing no vanadium. The other reaction conditions are as follows:

Flow rate of 1-butene: 2.34 litres/hour
Flow rate of oxygen: 4.5 litres/hour
Temperature: 50° C.
Duration of reaction: 5 hours
Amount of 93.5% strength $HNO_3$ added: 135 g.
Amount of butene employed: 29.2 g., i.e. 0.522 mol
Degree of conversion of the butene: 100%
Weight of mixture withdrawn at the end of the reaction: 380 g.
Nitric acid concentration at the end of the reaction: 54.7%.

By determinations carried out as in Example 1, the results are:

| Products | Quantity in mols | Carbon balance, percent | Molar yield per mol of 1-butene converted, percent |
|---|---|---|---|
| Acetic acid | 0.271 | 26 | 52 |
| Oxalic acid | 0.209 | 20 | 40 |
| Propionic acid | 0.136 | 19.8 | 26 |
| Formic acid | 0.006 | 0.25 | 1 |
| CO | 0.134 | 6.4 | 25.6 |
| $CO_2$ | 0.338 | 16.2 | 64.6 |

We claim:
1. Process for the production of a mixture of aliphatic carboxylic acids consisting mainly of acetic and propionic acids which comprises contacting 1-butene, alone or in admixture with 2-butene, with nitric acid of concentration 20 to 90% by weight in the presence, as catalyst, of a vanadium compound which provides vanadium ions in the reaction mixture, the temperature of the reaction mixture being 20 to 100° C.

2. Process according to claim 1 in which the vanadium compound is vanadium pentoxide, a vanadium salt, or an alkali metal or ammonium vanadate.

3. Process according to claim 1 in which the vanadium concentration is 0.001 to 5% by weight (calculated as vanadium).

References Cited
UNITED STATES PATENTS
2,847,465   8/1958   Robertson et al. _____ 260—533

LORRAINE WEINBERGER, Primary Examiner

R. D. KELLY, Assistant Examiner